March 25, 1952     Q. E. BASHORE     2,590,225
BOX HANDLING MECHANISM
Filed June 27, 1947     4 Sheets-Sheet 1

Fig. 1

INVENTOR:
QUINTER E. BASHORE
By His ATTORNEYS
HARRIS, KIECH, FOSTER & HARRIS

March 25, 1952 Q. E. BASHORE 2,590,225
BOX HANDLING MECHANISM
Filed June 27, 1947 4 Sheets-Sheet 2

Fig. 2

INVENTOR:
QUINTER E. BASHORE
BY HIS ATTORNEYS
HARRIS, KIECH, FOSTER & HARRIS

March 25, 1952 Q. E. BASHORE 2,590,225
BOX HANDLING MECHANISM
Filed June 27, 1947 4 Sheets-Sheet 4

INVENTOR:
QUINTER E. BASHORE
BY HIS ATTORNEYS
HARRIS, KIECH, FOSTER & HARRIS

Patented Mar. 25, 1952

2,590,225

UNITED STATES PATENT OFFICE 2,590,225

BOX HANDLING MECHANISM

Quinter E. Bashore, Covina, Calif.

Application June 27, 1947, Serial No. 757,522

20 Claims. (Cl. 214—8.5)

My invention relates to apparatus for handling such articles as boxes, cartons, trays, etc., which articles are all designated hereinafter by the generic term "boxes," and, since the invention was originally embodied in and is particularly applicable to an apparatus for unstacking boxes, I prefer to consider such an embodiment herein for convenience. However, as will be evident hereinafter, various features of the invention may be embodied in other apparatus without departing from the spirit thereof and it will be understood, therefore, that I do not desire to be limited to the specific embodiment disclosed herein for purposes of illustration.

Before proceeding to disclose the invention in detail, it is convenient to discuss one of the possible industries in which it is applicable with particular advantage. In the citrus industry, for example, extensive handling of boxes containing fruit is necessary in processing the fruit in packing houses, it frequently being necessary to stack and unstack boxes containing the fruit several times between its arrival at the packing house from the groves and its shipment to the consumer. Lemons, for example, are ordinarily picked while partially green, and must be stored for a considerable length of time before shipment to permit them to cure. The usual practice is to sort and wash the lemons upon arrival at the packing house and, subsequently, to pack the lemons in boxes which are then placed in storage. After the lemons have been stored for a sufficient length of time, they are then prepared for shipment.

From the foregoing, it will be apparent that the boxes containing the fruit must be handled several times prior to shipment. Since, in order to conserve space, the boxes are frequently placed in stacks of ten or more, it will be apparent that unstacking the boxes, e. g., during removal from storage, presents a serious problem, especially since lemons in particular must be handled carefully in order to prevent bruising.

With the foregoing observations in mind, it is a general object of my invention to provide an apparatus for removing boxes from a stack, preferably one at a time, and for transporting the boxes to a suitable box-receiving station.

More specifically, it is an object to provide an unstacking apparatus which includes means for continuously elevating a stack of boxes from a stack-receiving station, and which includes carriage means for removing successive boxes from the stop of the rising stack and for transporting the boxes removed from the stack to the box-receiving station. A related object is to provide an apparatus which includes means for transporting each box from the box-receiving station before arrival of the next box, which means may be a suitable conveyor.

Another object of the invention is to provide an unstacking apparatus of the foregoing general character wherein the carriage means is driven at a higher rate of speed than the elevating means so that each box is lifted clear of the rising stack immediately after it is engaged by the carriage means.

A further object of the invention is to provide a carriage means which is rotatable relative to a supporting structure or frame, and on which a plurality of pairs of box-engaging devices are mounted, the box-engaging devices of each pair being adapted to receive a box therebetween and to convey it to the box-receiving station.

An important object of the invention is to provide an apparatus having means for maintaining the orientation of the box-engaging devices constant with respect to the frame so as to maintain the boxes carried thereby in upright positions at all times while they are being transported to the box-receiving station.

An additional object of the invention is to provide an apparatus wherein the elevating means and the carriage means operate in timed relationship in such a manner that the box-engaging devices of each pair engage each box on opposite surfaces thereof at points substantially adjacent the bottom of the box. This permits the box-engaging devices to engage the strongest portion of each box to prevent damage thereto, which is an important feature of the invention.

Another important object is to provide a construction wherein each pair of box-engaging devices includes a pair of box-engaging members which are adapted to engage opposite vertical surfaces of a box to clamp it therebetween, such box-engaging members providing the sole means for grasping the box.

Still another important object of the invention is to provide a box-handling mechanism of the foregoing character wherein the box-engaging members of each pair of box-engaging devices are movable from inoperative to operative positions along downwardly converging paths so that the weight of a box held thereby tends to increase the clamping forces applied to the box. Thus, the clamping forces applied to the box are proportional to the weight of the box, which is an important feature of the invention.

More specifically, it is an object of the invention to provide a construction wherein the box-engaging members of each pair of box-engaging devices are rotatable toward each other about horizontal axes from inoperative to operative positions and which, when in their operative positions, are inclined upwardly from their respective axes of rotation so that the weight of a box engaged thereby tends to rotate them even closer together to increase the clamping forces applied to the box.

A further object is to provide an apparatus having means for moving the box-engaging members into their operative positions which operates in timed relationship with the carriage means and the stack-elevating means in such a manner that the box-engaging members are moved into their operative positions at substantially the instant that a box in the stack has been elevated to the proper position for removal from the stack. Another object in this connection is to provide means for moving the box-engaging members into their inoperative positions which operates in timed relationship with the carriage means in such a manner that the box is released at substantially the instant that it arrives at the box-receiving station.

Still another important object of the invention is to provide a box-handling mechanism of the foregoing general character which handles the boxes gently and with a minimum of jolting so as to substantially eliminate any possibility of damage to the contents of the boxes.

The foregoing objects and advantages of the invention, together with various other objects and advantages thereof which will be evident hereinafter, may be attained through the employment of the exemplary embodiment illustrated in the accompanying drawings and described in detail hereinafter. Referring to the drawings, which are intended as illustrative only:

Figure 1:
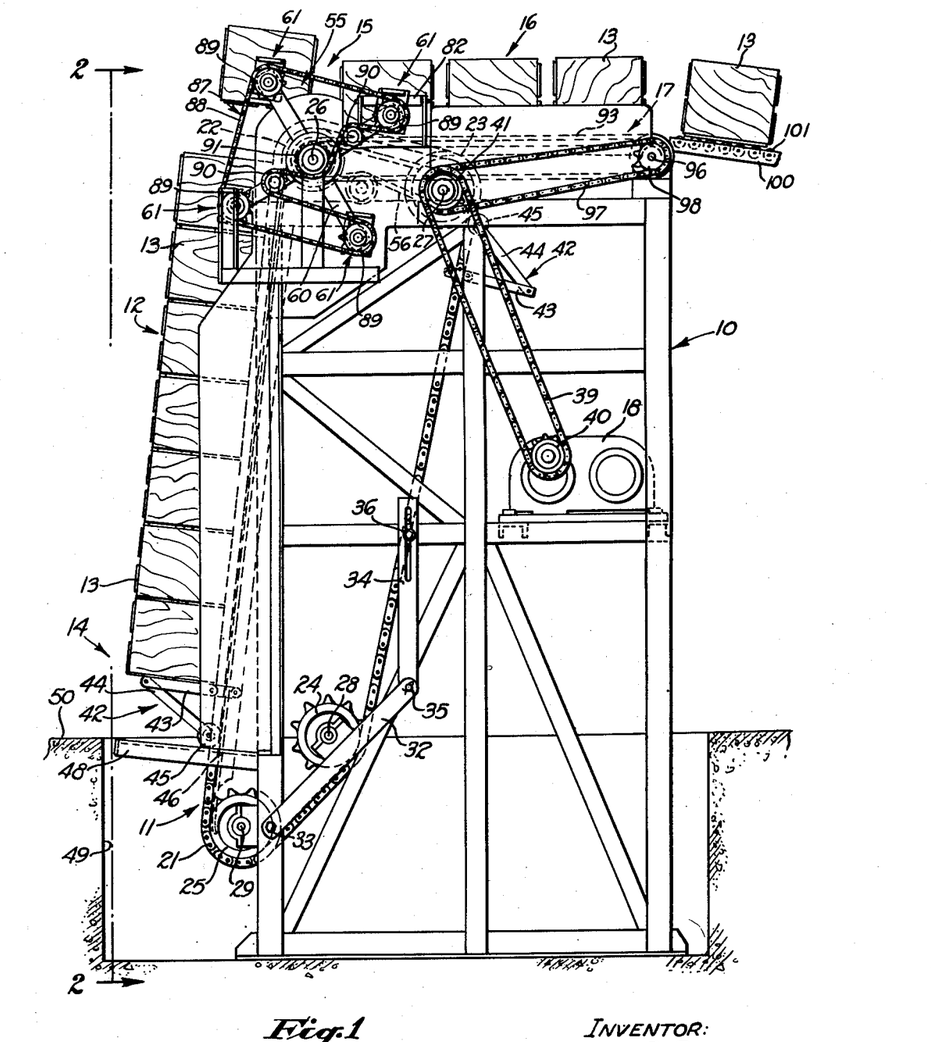
Fig. 1 is a side elevational view of an unstacking apparatus which embodies the fundamental principles of my invention.
Figure 2:
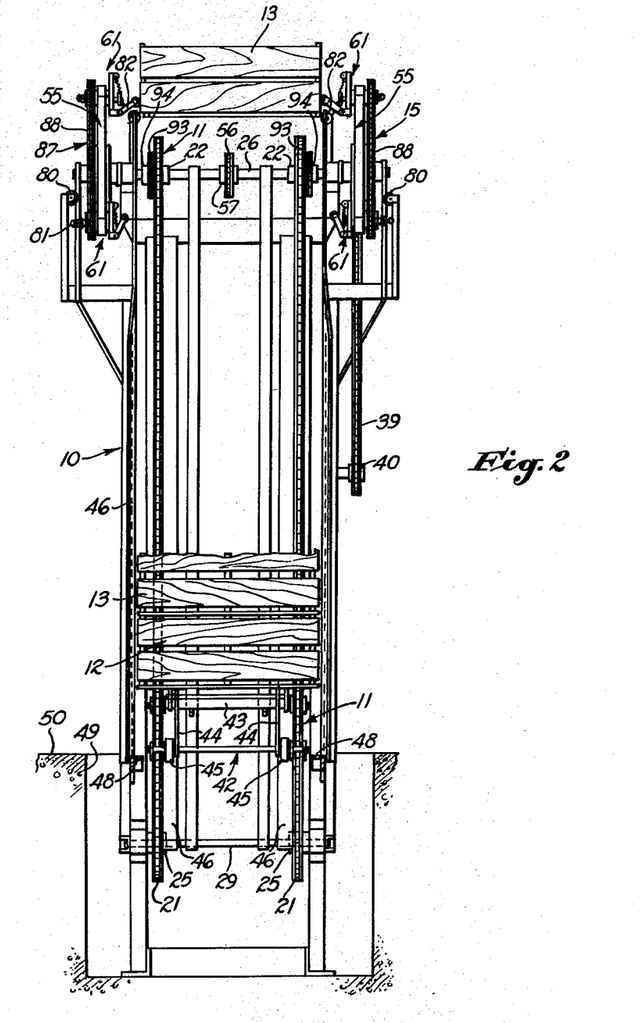
Fig. 2 is a front elevational view of the apparatus and is taken in the direction indicated by the arrows intersecting the broken line 2—2 of Fig. 1.
Figure 3:
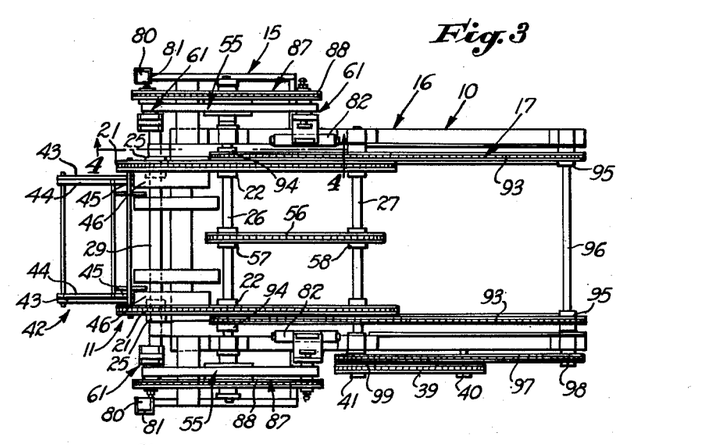
Fig. 3 is a plan view of the apparatus.

Referring particularly to Figs. 1, 2 and 3 of the drawings, I show an unstacking apparatus embodying my invention which includes a frame 10, means indicated generally by the numeral 11 for continuously elevating a stack 12 of boxes 13 from a stack-receiving station 14 along a generally vertical path, carriage means indicated generally by the numeral 15 for removing successive boxes from the rising stack and for moving such boxes to a box-receiving station 16, and conveyor means 17 for moving the boxes from the box-receiving station to some other station (not shown), which may be a suitable processing station, for example. The apparatus also includes means 18, which may be a variable speed electric motor, for driving the stack-elevating means 11, the carriage means 15 and the conveyor means 17.

Considering the apparatus in more detail, the stack-elevating means 11, which preferably lifts the stack 12 along a slightly inclined path to prevent tipping of the stack, may include a pair of endless chains 21 each of which is trained over sprockets 22, 23, 24 and 25, the pairs of sprockets 22, 23, 24 and 25 being carried by shafts 26, 27, 28 and 29, respectively, which are journaled in suitable bearings. The shaft 28 carrying the sprockets 24 is preferably mounted on arms 32, only one of which is shown in the drawings, which are pivotally connected to the frame 10 as indicated at 33. Slotted arms 34 are pivotally connected to the arms 32, respectively, at 35 and are connected to the frame 10 by bolts 36 disposed in the slotted portions thereof. Thus, as will be apparent from Fig. 1, by loosening the bolts and moving the slotted arms 34 upwardly or downwardly to rotate the arms 32 in either the counterclockwise or clockwise direction, the tension in the chains 21 may be decreased or increased as desired.

The shaft 27 is driven by the motor 18 through a chain 39 which is trained over sprockets 40 and 41, the sprocket 40 being suitably fixed on the shaft of the motor and the sprocket 41 being fixed on the shaft 27. The sprockets 23 over which the elevating chains 21 are trained are also fixed on the shaft 27 so that as this shaft is driven in the clockwise direction, as viewed in Fig. 1, by the motor 18, the sprockets 23 drive the elevating chains 21 in the clockwise direction. The sprockets 22 on the shaft 26 over which the elevating chains 21 are trained are rotatable relative to the shaft 26 for a reason which will be apparent hereinafter.

The elevating chains 21 carry a lifting means 42 comprising a platform 43 which is adapted to support the stack 12, the platform being braced by a pair of arms 44 terminating in rollers 45 which engage inclined guide rails 46 that form part of the frame 10. Preferably, two or more lifting means 42 are provided, these being spaced apart along the elevating chains 21 distances such that by the time one of the lifting means has elevated the bottom of a stack 12 to a point above the top of a subsequent stack, the next lifting means will be in a position to lift the subsequent stack.

Each lifting means 42 is adapted to pass through an open, rectangular platform 48 on which a stack 12 of boxes may be placed so that it will be picked up by the lifting means as it passes through the platform 48. The dimensions of the stack-receiving platform 48 must, of course, be such that it will support the stack of boxes in a position to be engaged by one of the lifting means 42 while permitting the lifting means to pass therethrough.

In the particular construction illustrated in the drawings, the apparatus is designed to receive a stack of boxes from a hand truck, or the like, although it will be understood that a suitable automatic conveyor system (not shown) may be provided for moving stacks of boxes into position on the stack-receiving platform 48. In order to permit the stacks of boxes to be placed on the platform 48 by a hand truck or a similar device, the apparatus is preferably located in a pit 49 below the level of the surrounding floor 50 although it will be understood that locating the apparatus in a pit may not be necessary if an automatic conveyor system is used to move tthe stacks of boxes into position on the stack-receiving platform 48.

It will thus be apparent that the stack-elevating means 11 is adapted to engage a stack 12 of boxes which has been placed on the stack-receiving platform 48 and to move the stack continuously in a generally vertical direction toward the carriage means 15. As previously indicated, the carriage means, which will now be described in detail, removes successive boxes from the top of the rising stack and transports them to the box-receiving station 16, from which they are moved by the conveyor means 17.

The carriage means 15 comprises a pair of carriages 55 which are fixed on the shaft 26 so as to be rotatable therewith. As best shown in Figs. 2 and 3, the shaft 26 is driven from the shaft 27 by an endless chain 56 trained over sprockets 57 and 58 which are suitably fixed on the shafts 26 and 27, respectively. As will be discussed in more detail hereinafter, the relative diameters of the sprockets 57 and 58 are such that the carriage means 15 is driven at a higher speed than the stack-elevating means 11 so that each box removed from the rising stack 12 by the carriage means will be lifted clear of the box therebeneath.

Considering the carriage means 15 in more detail, each of the carriages 55 includes a plurality of arms 60, each carriage being shown as having four arms although other numbers of arms may be employed if desired. Each of the arms 60 carries a box-engaging device 61 which is rotatable relative to the arm on which it is mounted. Each of the box-engaging devices 61 on one of the carriages 55 is paired with one of the box-engaging devices on the other carriage, the box-engaging devices of each pair being adapted to receive the uppermost box in the stack 12 therebetween and being adapted to frictionally engage opposite surfaces of this box as will be discussed in more detail hereinafter. Since the carriages 55 are rotated at a higher speed than the stack-elevating means 11, such rotation being in clockwise direction as viewed in Fig. 1, each pair of the devices 61 lifts the box carried thereby clear of the remaining boxes in the stack immediately after engaging it, which is an important feature of the invention. Subsequently, each pair of box-engaging devices 61 moves the box carried thereby along a circular discharge path to the box-receiving station 16 as will be discussed in more detail hereinafter.

Figure 4:
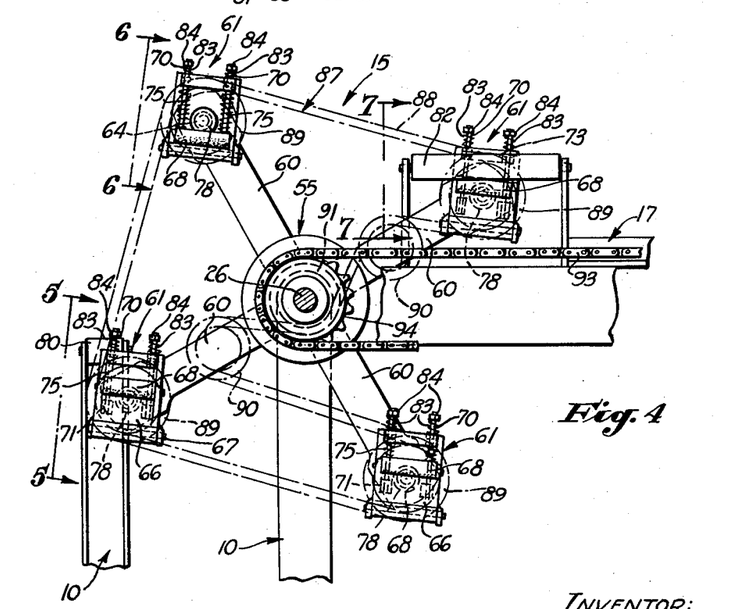
Fig. 4 is an enlarged, fragmentary view which is taken in the direction of the arrows intersecting the broken line 4—4 of Fig. 3 and which illustrates a carriage forming part of the apparatus.
Figures 5, 6, 7:
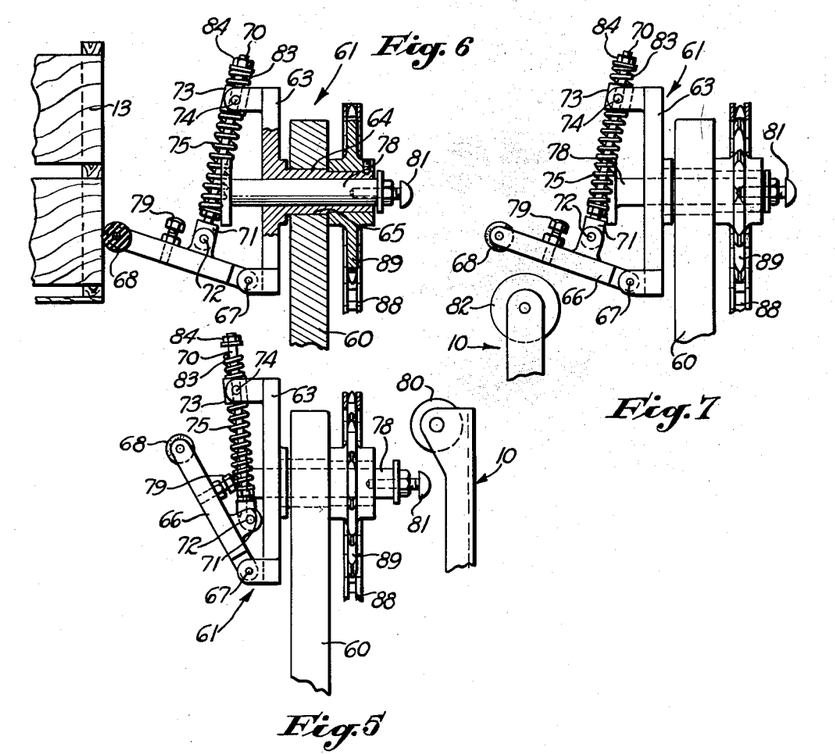
Figs. 5, 6 and 7 are further enlarged, fragmentary views which are taken in the directions of the arrows intersecting the broken lines 5—5, 6—6 and 7—7, respectively of Fig. 4, and which illustrate the operation of a box-engaging device forming part of the apparatus.

The construction of the box-engaging devices 61 will now be described with reference to Fig. 4 and with particular reference to Figs. 5 to 7 wherein one of the devices is shown in detail. As best shown in Figs. 5 to 7, each box-engaging device 61 includes a supporting member or bracket 63 having a tubular hub 64 which is journaled in a bore 65 through the arm 60 on which the device is mounted. A box-engaging member 66 is pivotally connected to the supporting bracket 63 at 67 and preferably includes a gripping element 68 which may be formed of or covered with rubber or a similar material if desired. A pair of link members 70, which may be rods, for example, are rigidly connected to members 71 which are pivotally connected to the box-engaging member 66 at 72, the rods 70 being slidable through openings in members 73 which are pivotally connected to the bracket 63 at 74. Compression springs 75 which encircle the rods 70, respectively, are interposed between the members 71 and 73.

The member 66 of each box-engaging device is movable from an inoperative position, which is shown in Fig. 5, to an operative position, which is shown in Fig. 6, wherein the gripping element 68 at the outer end thereof engages a box 13. It will be noted that the pivots 67, 72 and 74 are so arranged that the pivot 72 is disposed on one side of a straight line through the pivots 67 and 74 when the box-engaging member 66 is in its inoperative position, and is disposed on the opposite side of such a line when the box-engaging member is in its operative position. Thus, the link members 70 and the box-engaging member 66 form a toggle joint so that the compression springs 75 will hold the box-engaging member in either its inoperative position or in its operative position.

The box-engaging member 66 of each device 61 is adapted to be moved from its inoperative position to its operative position by a plunger 78 which is slidably disposed in the tubular hub of the bracket 63, the plunger being adapted to engage an adjustable projection 79, preferably a bolt, which is carried by the box-engaging member. It will be apparent that movement of the plunger toward the left, as viewed in Fig. 5, will result in rotation of the box-engaging member 66 in the counterclockwise direction to move the pivot 72 across a line through the pivots 67 and 74, whereupon the compression springs 75 move the box-engaging member into its operative position as shown in Fig. 6. Such movement of the plunger 78 may be effected by a roller 80 which is mounted on the frame 10 in a suitable location and which is adapted to engage a projection 81 on the plunger as the corresponding box-engaging device moves past the roller, there being one roller 80 associated with each of the carriages 55 as best shown in Fig. 2. In order to restore each box-engaging device to its inoperative position, I prefer to provide a roller 82 which is mounted on the frame 10 in a position to be engaged by the member 66 of each device, there being one roller 82 for each of the carriages 55.

I prefer to limit movement of the box-engaging member 66 of each device 61 toward its operative position in a yieldable manner for a reason which will be apparent hereinafter, and, for this purpose, I have provided a pair of compression springs 83 which encircle the upper ends of the rods 70, these springs being seated against the members 73 and being retained by nuts 84 threaded on the rods.

With the foregoing discussion of the structure of the box-engaging devices 61 in mind, the operation of the carriage means 15 will now be considered in detail. As a stack 12 of boxes is elevated by the stack elevating means 11, the carriages 55 rotate to bring a pair of the box-engaging devices 61 into a position to engage the uppermost box in the stack, the stack elevating means and the carriages operating in timed relationship by virtue of the driving mechanism described previously. As the pair of box-engaging devices reaches a position to engage the uppermost box in the stack, the projections 81 on the plungers 78 associated with the respective box-engaging devices encounter the rollers 80 to move the box-engaging members 66 of the respective devices from their inoperative positions to their operative positions. The rollers 80 are so positioned that they cause the gripping elements 68 carried by the members 66 to engage the box near its bottom to take advantage of the greater strength of the box at this point, which is an important feature of the invention.

Referring particularly to Fig. 6, it will be noted that the box-engaging members 66, when in their operative positions, are inclined upwardly from their respective pivot points 67 so that as the gripping elements 68 at the outer ends thereof are urged into frictional engagement with the opposite surfaces of the box by the compression springs 75, the weight of the box tends to cause the box-engaging members to rotate downwardly. This causes the gripping elements 68 to move toward each other so as to apply clamping forces to opposite surfaces of the box which are proportional to the weight of the box. In other words, the greater the weight of the box, the greater the clamping forces applied thereto by the gripping elements 68. It will be noted that the compression springs 83 at the upper ends of the rods 70 controlling the box-engaging members 66 limit downward rotation of the members in a yieldable manner so that the box will be picked up gently. The amount that the members 66 may rotate downwardly under the action of the weight of the box may be varied by loosening or tightening the nuts 84 which retain the springs 83. These nuts must, of course, be so positioned on the rods 70 that the box-engaging members 66 will not be permitted to rotate downwardly beyond a horizontal position.

As the members 66 of each pair of box-engaging devices 61 engage and securely clamp the uppermost box in the stack 12 therebetween in the foregoing manner, the box is lifted clear of the remaining boxes in the stack because of the fact that the carriages 55 are driven at a higher speed than the stack-elevating means 11, the speed of the carriages preferably being approximately twice that of the stack-elevating means in order to insure that the box will be lifted clear as soon as it is picked up by the box-engaging devices. As the carriages 55 rotate, the box is moved in a circular path toward the box-receiving station 16. At the same time, the stack-elevating means 11 continues to elevate the stack of boxes so that the next box in the stack is moved into a position to be picked up by the next pair of box-engaging devices 61.

As the box being carried by one of the pairs of box-engaging devices 61 reaches the box-receiving station 16, the box-engaging members 66 associated therewith encounter the rollers 82, there being one roller 82 on each side of the apparatus as best shown in Fig. 2. The rollers 82 cause the box-engaging members 66 to release the box and restore the members to their inoperative positions in the manner previously described, thereby depositing the box on the conveyor means 17. The rollers 82 are preferably so positioned that they cause the box-engaging members 66 to disengage the box just before the box is placed onto the conveyor means 17 so that the contents of the box will not be jostled. I have found, for example, that the rollers 82 may be so positioned that the box, when disengaged by the members 66 will drop considerably less than one-quarter of an inch, which is insufficient to damage even fruit which bruises easily.

Since the positions of the rollers 80 which actuate the box-engaging devices 61 and the operation of the stack-elevating means 11 are preferably so related that the box-engaging members 66 of each pair of devices engage opposite surfaces of the box adjacent the bottom of the box to take advantage of the additional strength provided by the bottom, it will be apparent that the center of gravity of the box will be above the points of contact between the surfaces of the box and the box-engaging members so that the box will have a tendency to overturn. Consequently, it is necessary to provide means for maintaining the box in an upright position, such a means being associated with each carriage 55 and being indicated generally by the numeral 87. As best shown in Fig. 4, the means 87 for maintaining the boxes upright includes a chain 88 which is trained around sprockets 89 carried by the respective box-engaging devices 61, idling sprockets 90 carried by two of the arms 60, and a sprocket 91. The sprockets 89 are fixed on the tubular hubs 64 of the brackets 63 associated with the respective box-engaging devices as best shown in Fig. 6. The idling sprockets 90 are rotatable relative to the arms 60 on which they are mounted and the sprocket 91 is rigidly connected to the frame 10 so that it remains stationary during rotation of the carriage 55 with which it is associated. Consequently, as each carriage 55 rotates relative to the frame 10, the fixed sprocket 91, acting through the chain 88 and the sprockets 89, causes the box-engaging devices 61 on the arms 60 of the carriage to rotate relative to the carriage in a direction opposite to the direction of rotation of the carriage relative to the frame. In order to maintain the boxes carried by the box-engaging devices 61 upright, the diameters of the sprockets 89 and the diameter of the fixed sprocket 91 associated with each of the carriages 55 must all be equal so that the speed of rotation of the box-engaging devices with respect to the carriages on which they are mounted will be equal to the speed of rotation of the carriages with respect to the frame 10 in order to maintain the orientation of the box-engaging devices with respect to the frame. Thus, the boxes are maintained upright as they are moved from the stack to the box-receiving station 16.

It will be noted that although the foregoing means 87 for maintaining the boxes upright would not be essential if the rollers 80 were so positioned that the box-engaging members 66 engaged the boxes above the centers of gravity thereof, the boxes would then be free to swing and damage to the contents thereof might result. The mechanism previously described, in addition to maintaining the boxes in upright positions, prevents any swinging of the boxes, which is an important feature of the invention.

As the boxes transported by the carriage means 15 reach the box-receiving station 16, they are removed therefrom by the conveyor means 17 as previously indicated. The conveyor means may, for example, include a pair of chains 93 each of which is trained over sprockets 94 and 95, the sprockets 94 being rotatably mounted on the shaft 26 and the sprockets 95 being fixed on a shaft 96 which is journaled in suitable bearings carried by the frame 10. The chains 93 are driven by a chain 97 which is trained over sprockets 98 and 99, the sprocket 98 being fixed on the shaft 96 and the sprocket 99 being fixed on the shaft 27. In the particular construction illustrated in Fig. 1 of the drawing, the chains 93 move the boxes from the box-receiving station 16 onto an inclined ramp 100 having a plurality of rollers 101 over which the boxes may travel to a processing station, for example.

I have found that my box unstacking apparatus is capable of handling boxes in a very gentle manner because of the action of the springs 83 which serve as cushions to eliminate any jolting as the boxes are picked up by the box-engaging devices 61, and because of the fact that the boxes are not released by the devices 61 until they have been placed on or substantially on the conveyor means 17. The mechanism for maintaining the boxes upright as they are removed from the stack and transported to the box-receiving station 16 also eliminates any possibility of damage to the contents of the boxes which might result if the boxes were permitted to swing freely from the arms 60 of the carriages 55.

I have found that in addition to being capable of handling boxes with a minimum of jolting, the apparatus is also capable of unstacking boxes at a surprisingly high rate of speed. For example, I have found that a machine constructed substantially in accordance with the accompanying drawings is capable of unstacking boxes at the rate of at least 90 per minute with no indication that this value represents a limit.

Although I have described an exemplary embodiment of my invention herein for purposes of illustration, it will be understood that I do not desire to be limited thereto since various changes, modifications and substitutions may be incorporated in this embodiment without necessarily departing from the spirit of the invention. Consequently, I hereby reserve the right to all such changes, modifications and substitutions as properly come within the scope of my invention as set forth in the appended claims.

I claim as my invention:

1. A box-handling apparatus of the character described, including: a supporting structure; a pair of clamping members which are carried by said supporting structure and which are movable relative thereto from inoperative to operative positions along horizontally spaced, downwardly converging paths, said clamping members, when in their inoperative positions, being spaced apart horizontally a distance sufficient to receive a box therebetween and, when in their operative positions, engaging opposite surfaces of the box, whereby the weight of the box tends to cause said clamping members to continue to move along said downwardly converging paths so as to increase the clamping forces applied to the box thereby; and means for moving said clamping members between said inoperative and operative positions.

2. A box-handling apparatus of the character described, including: a supporting structure; a pair of clamping members which are carried by said supporting structure and which are rotatable relative thereto toward each other from inoperative to operative positions about substantially horizontal axes which are spaced apart in a substantially horizontal direction, said clamping members, when in their inoperative positions, being spaced apart horizontally a distance sufficient to receive a box therebetween and, when in their operative positions, engaging opposite surfaces of the box and extending upwardly from their respective axes of rotation, whereby the weight of the box tends to rotate said clamping members downwardly to decrease the spacing therebetween so as to increase the clamping forces applied to the box; and means for rotating said clamping members between said operative and inoperative positions.

3. In a box-handling apparatus, the combination of: a frame; a pair of horizontally spaced, substantially parallel carriages carried by said frame and rotatable relative thereto about a common axis; a box-engaging device carried by each of said carriages, said box-engaging devices being spaced apart horizontally to receive a box therebetween and being rotatable relative to said carriages about a common, substantially horizontal axis which is spaced from the axis of rotation of said carriages; means for rotating said carriages relative to said frame; and means for simultaneously rotating said box-engaging devices relative to said carriages at a rotational speed equal to the rotational speed of said carriages so as to maintain constant the orientation of said box-engaging devices with respect to said frame.

4. In a box-handling apparatus, the combination of: a frame; a pair of horizontally spaced, substantially parallel carriages carried by said frame and rotatable relative thereto about a common, substantially horizontal axis; a box-engaging device carried by each of said carriages, said box-engaging devices being rotatable relative to the respective carriages about a common, substantially horizontal axis which is spaced from the axis of rotation of said carriages; means for rotating said carriages relative to said frame in a predetermined direction; and means for rotating said box-engaging devices relative to said carriages in a direction opposite to the direction of rotation of said carriages relative to said frame and at a rotational speed equal to the rotational speed of said carriages relative to said frame so as to maintain constant the orientation of said box-engaging devices with respect to said frame, said means for rotating said box-engaging devices comprising a pair of driving members which are rigidly connected to said frame and which are operatively connected, respectively, to a pair of driven members carried by the respective box-engaging devices.

5. A box-handling apparatus as set forth in claim 4 wherein said driving and driven members are sprockets and wherein the operative connection between the respective driving and driven members comprises an endless chain trained thereover.

6. In a box-handling apparatus of the character described, the combination of: a frame; a carriage carried by said frame and rotatable relative thereto; a plurality of circumferentially spaced, box-engaging devices carried by said carriage and rotatable relative thereto about an axis which is spaced from and substantially parallel to the axis of rotation of said carriage; a driving sprocket symmetrical about the axis of rotation of said carriage and rigidly connected to said frame; a driven sprocket carried by each of said box-engaging devices; an endless chain trained over said driving sprocket and over each of said driven sprockets in such a manner that said chain, when said carriage is rotated relative to said frame in a predetermined direction, rotates said driven sprockets relative to said carriage in the opposite direction at a rotational speed equal to that of said carriage relative to said frame so as to maintain constant the orientation of said box-engaging devices with respect to said frame; and means for rotating said carriage relative to said frame in said predetermined direction.

7. In a box-engaging device, the combination of: a supporting member; a box-engaging member pivotally connected to said supporting member at a first pivot point and rotatable relative thereto between operative and inoperative positions; a link member pivotally connected to said supporting member at a second pivot point and pivotally connected to said box-engaging member at a third pivot point, said pivot points being so arranged that said third pivot point lies on one side of a straight line through said first and second pivot points when said box-engaging member is in its inoperative position and lies on the opposite side of such a line when the box-engaging member is in its operative position so that said link member and said box-engaging member form a toggle joint; and resilient means interposed between said supporting member and said box-engaging member for retaining said box-engaging member in either its operative or its inoperative position.

8. A box-engaging device as set forth in claim 7 including means for moving said third pivot point across a straight line through said first and second pivot points from one side thereof to the other.

9. A box-engaging device as set forth in claim 7 including resilient means interposed between said supporting member and a portion of said link member for yieldably limiting the distance which said third pivot point may move from a straight line through said first and second pivot points.

10. In a box-handling mechanism, the combination of: a frame; a pair of spaced box-engaging devices adapted to receive a box therebetween and respectively including box-engaging members which are movable from inoperative positions to operative positions to engage opposite surfaces of the box; carriage means carried by and rotatable relative to said frame for moving said box-engaging devices along parallel, circular paths; means for moving said box-engaging members from their inoperative positions to their operative positions at first points on the respective paths of said box-engaging devices; and means for moving said box-engaging members from their operative positions to their inoperative positions at second points on the respective paths of said box-engaging devices.

11. A box-handling mechanism as set forth in claim 10 including means operating in timed relationship with said carriage means for moving a box into a position to be engaged by said box-engaging members when said box-engaging devices reach said first points on their respective paths.

12. In a box-handling mechanism, the combination of: a frame; a pair of spaced box-engaging devices adapted to receive a box therebetween and respectively including box-engaging members which are movable from inoperative positions to operative positions to engage opposite surfaces of the box; carriage means for moving said box-engaging devices relative to said frame along parallel paths; actuating means on said carriage means for moving said box-engaging members from their respective inoperative positions to their respective operative positions; and means on said frame in the paths of said actuating means for operating said actuating means when said box-engaging devices reach first points on their respective paths so as to move said box-engaging members from their inoperative positions to their operative positions.

13. A box-handling mechanism as set forth in claim 12 including means operating in timed relationship with said carriage means for moving a box into a position to be engaged by said box-engaging members when said box-engaging devices reach said first points on their respective paths.

14. A box-handling mechanism according to claim 12 including means on said frame in the paths of said box-engaging members for moving same from their respective operative positions to their respective inoperative positions when said box-engaging devices reach second points on their respective paths.

15. In an apparatus for unstacking a stack of boxes, the combination of: a frame; an elevator carried by said frame and movable relative thereto along a generally vertical path for moving the stack of boxes along said path; a conveyor carried by and movable relative to said frame and disposed adjacent said elevator; rotatable carriage means including clamping means movable along a circular path connecting said elevator and said conveyor for lifting the uppermost box in the stack clear of the remaining boxes therein and for moving such box along said circular path and placing it on said conveyor, said carriage means being carried by said frame and having a single axis of rotation; and means for maintaining constant the orientation of said clamping means relative to said frame so as to maintain such box substantially upright.

16. In an apparatus for unstacking a stack of boxes, the combination of: a frame; an elevator carried by said frame and movable relative thereto along a generally vertical path for moving the stack of boxes along said path; box-engaging devices movable along a discharge path which comprises an arc of a circle and which extends upwardly and diverges horizontally from said path of said elevator for engaging a box in the stack and for moving it along said discharge path; a carriage structure carried by and rotatable relative to said frame about a substantially horizontal axis for moving said box-engaging devices along said discharge path, said box-engaging devices being mounted on said carriage structure and being rotatable relative thereto about substantially horizontal axes substantially parallel to the axis of rotation of said carriage structure; first driving means for driving said elevator; second driving means operating in timed relationship with said first driving means for driving said carriage structure; and means for rotating said box-engaging devices relative to said carriage structure at a rotational speed equal to the rotational speed of said carriage structure relative to said frame, but in the opposite direction, so as to maintain constant the orientation of said box-engaging devices with respect to said frame to maintain substantially upright the box being moved by said box-engaging devices.

17. An apparatus as set forth in claim 16 wherein said second driving means includes means for driving said carriage structure at a rotational speed such that the speed of said box-engaging devices along said discharge path exceeds the speed of said elevator along said generally vertical path.

18. In an apparatus for unstacking a stack of boxes, the combination of: a frame; an elevator carried by said frame and movable relative thereto along a generally vertical path for moving the stack of boxes along said path; box-engaging devices movable along a generally semi-circular discharge path having an initial portion which extends upwardly and diverges horizontally from said path of said elevator and having a final portion which extends in a generally downward direction for engaging a box in the stack and for moving it along said discharge path; means mounting said box-engaging devices on said frame for moving said box-engaging devices along said discharge path; means on said frame and engageable with said box-engaging devices for engaging a box in the stack with said box-engaging devices at the beginning of the initial portion of said discharge path; means on said frame and engageable with said box-engaging devices for disengaging said box-engaging devices from the box at the end of said final portion of said discharge path; and means for conveying a box disengaged by said box-engaging devices along a substantially horizontal path which intersects the end of said final portion of said discharge path.

19. In apparatus for unstacking a stack of boxes, the combination of: a frame; means carried by said frame for elevating the stack of boxes along a substantially vertical path; clamping means including a pair of clamping devices movable along a discharge path which intersects said substantially vertical path for engaging a box in the stack and for moving it along said discharge path; carriage means carried by said frame for moving said clamping means along said discharge path; means carried by said frame for actuating said clamping means at the intersection of said paths to cause said clamping means to engage a box in the stack; first driving means carried by said frame for driving the stack-elevating means; and second driving means carried by said frame and operating in timed relationship with said first driving means and driving said carriage means for moving said clamping means to said intersection at the same time that a point substantially adjacent the bottom of a box in the stack is moved to said intersection, whereby said clamping means engages the box substantially adjacent the bottom thereof to minimize any tendency of the clamping means to crush the box.

20. An apparatus as defined in claim 2 wherein the means last defined includes a pair of toggle mechanisms respectively connecting said clamping members and said supporting structure.

QUINTER E. BASHORE.

REFERENCES CITED

The following references are of record in the file of this patent:

UNITED STATES PATENTS

| Number | Name | Date |
|---|---|---|
| 1,290,675 | Stebler et al. | Jan. 7, 1919 |
| 1,615,965 | Straight | Feb. 1, 1927 |
| 1,907,457 | Stevenson | May 9, 1933 |
| 1,907,458 | Stevenson | May 9, 1933 |
| 2,258,461 | Marsden et al. | Oct. 7, 1941 |